United States Patent [19]

Madden

[11] Patent Number: 5,412,874
[45] Date of Patent: May 9, 1995

[54] U-BOLT TORQUING METHOD AND TOOL

[75] Inventor: Freddie Madden, Cincinnati, Ohio

[73] Assignee: Consolidated Metal Products, Inc., Cincinnati, Ohio

[21] Appl. No.: 192,496

[22] Filed: Feb. 7, 1994

[51] Int. Cl.$^6$ .............................................. G01B 3/14
[52] U.S. Cl. ................................ 33/1 SB; 33/563
[58] Field of Search .............. 33/1 SB, 1 SD, 561.1, 33/562, 563, 567, 501.08, 501.09, 501.45, 555.1, 542, 201; 235/70 R, 70 A, 69, 89 A; 116/321, 322, 323

[56] References Cited

U.S. PATENT DOCUMENTS

| 27,140 | 2/1860 | Maranville | 33/679.1 |
| 387,284 | 8/1888 | Dupee | 33/562 |
| 1,860,174 | 5/1932 | Cronk | 33/563 |
| 2,304,327 | 12/1942 | Anderson | 33/1 SD |
| 4,324,975 | 4/1982 | Rees | 235/70 A |
| 5,253,427 | 10/1993 | Bartlett | 33/501.08 |

FOREIGN PATENT DOCUMENTS 439319 12/1955 United Kingdom ............... 33/562

Primary Examiner—William A. Cuchlinski, Jr.
Assistant Examiner—G. Bradley Bennett
Attorney, Agent, or Firm—Wood, Herron & Evans

[57] ABSTRACT

A method of determining the optimum torque for securing a U-bolt assembly calculated according to the formula $T = UL \cdot d \cdot K \cdot LF$, where T is the optimum torque, UL is a calculated value for the ultimate tensile load of one U-bolt leg, d is the diameter of the threaded end of one U-bolt leg, K is a torque coefficient of friction associated with the U-bolt assembly, and LF is a chosen load safety factor. A tool used in securing the U-bolt assembly includes at least one surface having torquing indicia located thereon and a radius for testing the bend radius on the U-bolt. The torquing indicia includes U-bolt assembly designation data and a corresponding optimum torque value.

7 Claims, 1 Drawing Sheet

U-BOLT TORQUING METHOD AND TOOL

FIELD OF THE INVENTION

The present invention relates to U-bolts, and more particularly to a method and tool for determining the optimum torque to be used in installing the U-bolt.

BACKGROUND

U-bolts are used in many applications, including to clamp together the axle and leaf springs of an automobile. Such bolts have a general U-shape, typically with two end-threaded legs. In a typical U-bolt clamping system or assembly, each leg is inserted through a hole formed in a bracket and a nut is threaded onto the end of each leg, thereby capturing the bracket. Two or more elements, for example, an automobile axle and leaf springs, may be clamped together by positioning the U-bolt and bracket around the elements. With this accomplished, the nuts are then tightened or torqued until the elements are sufficiently clamped together.

For a U-bolt to perform its function properly, the clamping or compression force it applies to the elements must exceed any external forces working to separate the elements. The amount of clamping force exerted by the U-bolt assembly against the elements is dependent upon how much torque is applied during the tightening of the nuts. Not only is it desirable to apply enough clamping force to overcome external forces, it is also necessary to avoid over torquing the nuts beyond the ultimate strength of the U-bolt. Therefore, it is desirable to be able to precalculate the optimum torque to be applied to the nuts of a particular U-bolt assembly in order to choose the proper U-bolt assembly for a particular clamping application.

Previously, the applied torque for U-bolts was calculated by multiplying the tension load needed to be applied to each U-bolt leg (in order to apply the desired clamping load to the elements) by the diameter of one leg and then by a torque coefficient of friction. This relation may be represented by the formula $T = W \cdot d \cdot K$, where T is the torque applied to each nut, W is the tension load for each U-bolt leg, d is the nominal diameter of each leg and K is the coefficient of friction associated with torquing each nut. The torque-tension correlation may be determined by solving for the "K" factor (i.e., $K = T/(W \cdot d)$). This formula worked well for determining the appropriate applied torque for standard headed fasteners, such as straight bolts. However, this formula is often inadequate for calculating the appropriate applied torque for U-bolt assemblies.

In general, U-bolts are known for failing at either bend before failing at the threaded ends of their legs. The former method of calculating the optimum torque for a U-bolt has been found unacceptable in accurately calculating the applied torque that will consistently cause the U-bolt to fail. It has been recognized that U-bolts may not sustain a load equivalent to two straight bolts or studs of the same size and grade as the legs of the U-bolt. Thus, in order to determine the actual load carrying capacity of any given U-bolt, the performance of saddle load tests on actual samples of the subject U-bolts has been recommended before the U-bolt assembly is installed. Having to perform such tests before installing the U-bolt assembly is time consuming and costly.

Notwithstanding the prior art, there remains a need for a method of pre-determining the optimum torque for a given U-bolt assembly which is more closely correlated to the actual applied torque, to the necessary clamping force exerted by the U-bolt assembly, and the strength of the U-bolt itself.

SUMMARY OF THE INVENTION

The present invention is directed to a method of determining the optimum torque used to secure a U-bolt assembly for a particular clamping application without having to conduct performance tests on actual samples of the particular U-bolts installed. The present method is able to consistently predict the ultimate strength of the U-bolt and the applied torque that will consistently cause the U-bolt to fail, for a particular U-bolt assembly. The present method thus enables a U-bolt assembly to be installed with the appropriate optimum torque being consistently applied and reduces the likelihood that the U-bolt assembly will fail in use. The present invention is also directed to a tool for determining the optimum torque used in securing the U-bolt assembly.

In one of its aspects, the present invention provides a method of determining the optimum torque used to secure a U-bolt assembly, like the one previously described. In accordance with this method, a predicted reduction in strength of the U-bolt due to one of the bends in the U-bolt is calculated according to the formula $B = [(R/D)X] + C$, where B is less than or equal to one (1). B is the predicted reduction in strength, R is the bend radius of one of the bends in the U-bolt, D is the diameter of one of the legs of the U-bolt, X is a regression coefficient which represents the effect variations in U-bolt leg diameter D and bend radius R have on the strength of the U-bolt. C is a regression constant which is the theoretically highest percentage of original tensile strength the U-bolt would have if the bend radius was zero. After B has been calculated, the ultimate tensile load of one of the end-threaded legs of the U-bolt is calculated according to the formula $UL = CA \cdot TN \cdot B$. UL is the ultimate tensile load, CA is the cross-sectional area of one of the legs of the U-bolt, TN is the ultimate tensile strength of the U-bolt material, and B is the predicted reduction in strength. Now the optimum torque used to secure each of the end-threaded legs of the U-bolt can be calculated according to the formula $T = UL \cdot d \cdot K \cdot LF$. T is the optimum torque, UL is the ultimate tensile load, d is the outer or nominal diameter of the threaded end of one of the U-bolt legs, K is a torque coefficient of friction associated with the U-bolt assembly, and LF is a chosen load safety factor which may be a number less than or equal to one. The diameter d at the threaded end of each U-bolt leg is not always equal to the diameter D of the balance of the U-bolt leg. For example, when the threads are rolled, the diameter d is typically larger than the diameter D. While the use of diameter d in calculating the optimum torque T is preferred, it will be appreciated by those skilled in the art that when the diameter d is greater than the diameter D satisfactory optimum torque values may be obtainable by using diameter D rather than d.

Once it has been determined, the optimum torque is applied to the nut threaded on the end of each U-bolt leg in order to secure the U-bolt assembly. Preferably, the nuts are initially tightened to snug-up the U-bolt assembly before the optimum torque is applied.

The present invention also provides a tool for determining the optimum torque used in securing the U-bolt assembly. In its simplest form, this tool includes a surface and an edge, with the edge having a corner and indicia being located on the surface. The corner has a radius equal to the bend radius of one U-bolt leg. The corner may be used to verify or determine the radius of the U-bolt bends of the particular U-bolt assembly being installed. The indicia includes an optimum torque value for corresponding U-bolt assembly designation data. In a modification of this embodiment, the indicia includes a plurality of optimum torque values and designation data for a plurality of corresponding U-bolt assemblies which use U-bolts having the same bend radius. In another modification of this embodiment, the present tool includes a plurality of such surfaces with the corner of each surface having a radius equal to a different bend radius.

In another embodiment, the present tool includes a slide holder having a pocket cavity with an outer surface. The outer surface has at least one aperture formed therethrough. The holder also includes an edge having at least one corner with a radius equal to the bend radius of one U-bolt leg. As with the other embodiment, the corner may be used to verify or determine the radius of the U-bolt bends of the particular U-bolt assembly being installed. A slide, also having a surface, is slidable within the pocket cavity to varying depths. One or the other of the U-bolt assembly designation data and optimum torque values corresponding to the designation data is located on these surfaces. Varying portions of the indicia on the slide surface are visible through the slide holder aperture as the depth of the slide in the pocket cavity is varied. A particular type of U-bolt assembly may be selected by inserting the slide into the pocket cavity a particular depth. Once the slide is inserted at the desired depth, the optimum torque for the particular type of U-bolt assembly selected is readable through the slide holder aperture.

The principles of the present invention, its objectives and advantages, will be further understood with reference to the following detailed description of the invention.

DETAILED DESCRIPTION OF THE DRAWINGS

Figure 1:
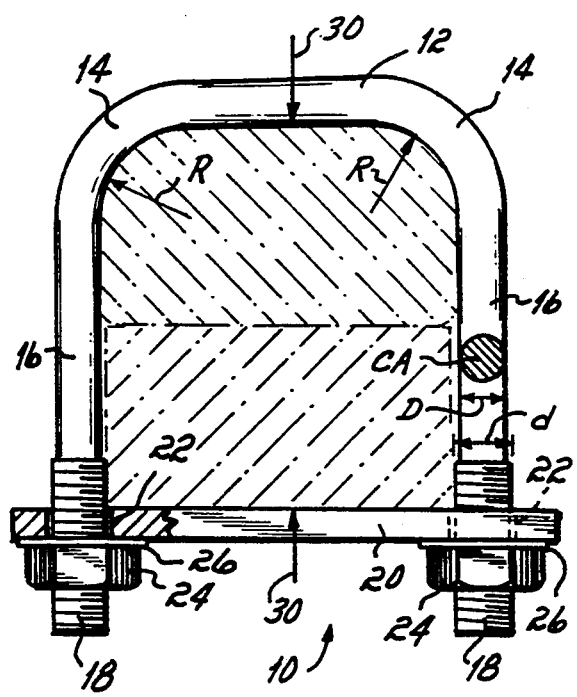
FIG. 1 is a front partially sectioned view of a typical U-bolt assembly in an installed condition.

Referring to FIG. 1, a typical U-bolt assembly 10 includes a U-bolt 12 made of a material, such as steel, having an ultimate tensile strength. The U-bolt 12 may be a piece of bar stock with one or two bends 14 formed along its length in order to make two legs 16. Each leg 16 has one end 18 which is threaded and a bend radius R at its other end. The two radii R are typically the same. For purposes of example, the threads on each end 18 of the U-bolt 12 are rolled. Thus, each leg 16 has a nominal diameter d and a pitch diameter D, along with a cross-sectional area CA. The nominal diameter d is the outside diameter of the threaded end 18, and the pitch diameter D is the actual outside diameter of each leg 16 as well as the diameter at the base of the threads at each end 18. The cross-sectional area CA is the area calculated using the pitch diameter D. A bracket 20 has two spaced apart holes 22. Each hole 22 receives a corresponding U-bolt leg 16. Each U-bolt leg 16 is disposed through its respective bracket hole 22 and a nut 24 threaded onto each end 18. Optionally, a washer 26 may be disposed between each nut 24 and the bracket 20. In clamping two or more elements together, the elements (shown in phantom cross-section) are disposed within the U-bolt assembly 10. The nuts 24 are sufficiently tightened or torqued to apply a compressive load (indicated by arrows 30) to the elements between the U-bolt 12 and bracket 20. Preferably, the nuts 24 are tightened to an optimum torque which produces a compression force great enough to keep the elements sufficiently clamped together against the exertion of external forces.

As the nuts 24 are tightened, the compression force 30 increases and an ever increasing tensile load is applied to each U-bolt leg 16. In determining the optimum torque used to secure the U-bolt assembly 10 in place, the ultimate strength of the U-bolt 12, itself, must be considered as well as the need to apply a sufficient clamping force.

In general, U-bolts are known for failing at either bend 14 before failing along either leg 16 or threaded end 18. In determining the optimum U-bolt torque, a predicted reduction in strength of the U-bolt as a result of each bend 14 is first calculated according to the formula $B=[(R/D)X]+C$, where B is the predicted reduction in strength, which is less than or equal to one (1). R is the bend radius for each U-bolt bend 14, and D is the diameter of each leg 16. X is a regression coefficient which represents the effect variations in U-bolt leg diameter D and bend radius R have on the strength of the U-bolt. C is a regression constant which is the theoretically highest percentage of original tensile strength the U-bolt would have if the bend radius R was zero.

The regression coefficient X and constant C were obtained by first conducting saddle load tests, to failure, on a variety of U-bolt 12 combinations. In general, a saddle load test involved positioning the sample U-bolt 12 on a fixed pad (similar to the upper element shown in phantom in FIG. 1) and applying an even load to both U-bolt legs 16 until failure occurred. The results of these tests for each U-bolt type (i.e., U-bolt leg diameter D and material) tested are compiled in Table I. The actual ultimate tensile load UL of each U-bolt was obtained by performing ultimate saddle load tests on a variety of each U-bolt type (i.e., various bend radii R). The actual ultimate tensile strength TN of each U-bolt material was obtained by performing a tensile (i.e., pull) test on sample straight lengths of the same diameter (D) stock material from the same lot (i.e., heat) as that used to make the legs 16 of the U-bolts 12 tested. Using the results of these tests, a regression analysis was performed comparing the actual UL of each U-bolt type (i.e., saddle load test) with a calculated theoretical UL of each U-bolt type for each U-bolt leg diameter D and bend radius R combination. The theoretical UL of each U-bolt 12 tested was calculated according to the formula $UL=2CA \cdot TN$, where CA is the cross-sectional area of one U-bolt leg 16 and TN is the ultimate tensile strength of the U-bolt material. Actual TN's from the prior tensile tests were used in this calculation.

TABLE I

| | Ultimate Saddle Load Test Results | | | | | | |
|---|---|---|---|---|---|---|---|
| Material/Dia. D (in) | 2¼" R (PSI) | 1½" R (PSI) | ¾" R (PSI) | ⅜" R (PSI) | ¼" R (PSI) | ⅛" R (PSI) | ⅜" R* (PSI) |
| 1541/0.465 | 40,500 | 40,360 | 38,680 | 35,640 | 33,980 | 30,700 | 35,360 |
| 1541/0.586 | 66,660 | 65,140 | 60,400 | 55,580 | 53,100 | 48,180 | 55,020 |
| 1038/0.560 | 54,980 | 54,740 | 51,980 | 47,700 | 44,940 | 41,460 | 47,180 |
| 1552/0.586 | 79,740 | 78,260 | 72,320 | 65,180 | 61,800 | 57,020 | 65,000 |
| 1552/0.825 | 153,105 | 146,385 | 129,015 | 113,890 | 114,865 | 108,350 | 116,830 |
| 1541/0.825 | 135,910 | 133,000 | 116,965 | 107,050 | 107,125 | 101,380 | 104,775 |
| 1045/0.825 | 133,860 | 127,905 | 114,200 | 101,820 | 100,970 | 97,012 | 105,440 |
| 1552/0.825 (Heat Treated) | — | 165,465 | 141,895 | 127,330 | 123,725 | 120,340 | 129,870 |

*These U-bolts were tested with pads having corner radii of ⅜". The other U-bolts were tested with pads having corner radii equal to their bend radii.

The actual regression calculation used to obtain coefficient X and constant C of the different U-bolts 12 tested was performed using an IBM compatible, 386 processor with a Lotus 1-2-3 software package, version 2.3, having a regression analysis function. The software was manufactured by Lotus Development Corporation, Cambridge, Mass. A total regression output was obtained with a regression constant C of 0.702 and coefficient X of 0.066. Even so, the preferred constant C is 0.65 and coefficient X is 0.07. These values were chosen as the best fit for all of the U-bolt types tested. It is believed that satisfactory results may still be obtained if the constant C is slightly reduced and the coefficient X is slightly increased. For example, decreasing the constant C to 0.60 and increasing the coefficient X to 0.08 may produce similar if not the same results (i.e., the predicted reduction in strength B). Using regression coefficients X within the range of about 0.01 to about 0.10 and regression constants C within the range of about 0.50 to about 0.90 may produce satisfactory results. In deciding on the constant C and coefficient X to use, it is important not to overcalculate the predicted reduction in strength B (i.e., calculate too large of a value for B). To be safe, it is typically better to undercalculate rather than overcalculate the B value. Most U-bolt sizes (nominal diameters) fall within the range of about ⅜ of an inch up to about 1¼ inches. While only U-bolts 12 having diameters D from about 0.465 inches up to about 0.825 inches were tested, it is believed that the calculated regression coefficient X and constant C equally apply to other size U-bolts 12.

As the bend radius/diameter ratio (R/D) decreases, the strength of the U-bolt at the bends 14 decreases. That is, the bend factor B decreases. Once the bend factor B has been calculated for a given U-bolt 12, the ultimate tensile load UL of each U-bolt leg 16 is calculated according to the formula $UL = CA \cdot TN \cdot B$. CA is the cross-sectional area of each U-bolt leg 16, a measurable parameter. TN is the ultimate tensile strength of the U-bolt material, which is dependent upon the chemistry of the material used and the processing that the material is subjected to. Comparisons made between the ultimate tensile load UL calculated according to the preceding formula of the present invention and actual ultimate saddle load test results reveal that the present formula for calculating UL is accurate within about 5%.

Once the ultimate tensile load UL of each U-bolt leg 16 is calculated, the optimum torque T used to tighten each nut 24 is calculated according to the formula $T = UL \cdot d \cdot K \cdot LF$. K is a coefficient of friction associated with the U-bolt assembly 10, that is, the coefficient of friction associated with tightening or torquing nuts 24. LF is a load safety factor which is a number less than or equal to one, and d is the outer diameter of each threaded end 18.

The coefficient of friction K may be affected by a number of friction factors. These factors include the outer diameter d and/or the surface area of each threaded end 18 in contact with its respective nut 24 and the thread finish of the threaded ends 18 and nuts 24. Other factors may include the finish of any bearing surfaces, such as that found between the washers 26 and their respective nuts 24 and the bracket 20. The stiffness of the joint formed between the U-bolt assembly 10 and the elements being clamped (shown in phantom) is also a factor. For example, if the U-bolt 12 and nut 24 are made of high-strength material and the washer 26 is of a softer material, the washer 26 is likely to gall during torquing of the nut 24 because of its relative softness. This lack of stiffness of the joint produces additional friction which must be overcome by applying greater torque to the nuts 24. The tolerance between the threads of each threaded end 18 and their respective nuts 24 is also a friction factor. The speed at which the U-bolt assembly 10 is assembled (i.e., the nuts 24 are torqued) also influences the torque coefficient of friction K. Generally, the faster the nuts 24 are tightened, the greater the applied torque must be to produce the same tensile load on the U-bolt legs 16. While a number of friction factors have been discussed herein, the factors discussed are not necessarily all inclusive nor do each of these factors necessarily affect the coefficient K to the same degree. Some friction factors may in fact be discarded because their impact is not significant enough.

The torque coefficient of friction K for any given U-bolt assembly 10 may be calculated according to the formula $K = t/(d \cdot w)$, where t is the torque applied to each nut 24, d is the outer diameter of each threaded end 18, and w is the resulting tension applied to each U-bolt leg 16 as the respective nuts 24 are torqued. Using this formula, the coefficient of friction K associated with any given U-bolt assembly 10 may be calculated from empirically obtaining values for t, d and w. As the coefficient of friction K increases, the tension w applied to each leg 16, and thereby the compression force 30 applied to the elements being clamped, decreases for any given torque t applied to nuts 24. Thus, the optimum torque T increases as the coefficient of friction K increases.

Each U-bolt assembly 10 is preferably designed to include a U-bolt 12 capable of withstanding greater tensile loads than the actual load bolt 12 is expected to be subjected to while in use. This design preference may be accomplished by utilizing a load safety factor LF of less than one. While the load safety factor LF may vary for different U-bolt applications, using a minimum load safety factor LF of about 0.6 and a maximum of about 0.75 has been found acceptable for U-bolt applications in general. These LF values are used to calculate a minimum optimum torque value Tmin and a maximum optimum torque value Tmax, respectively. Thus, Tmin is equal to about 60% and Tmax is equal to about 75% of the ultimate torque each leg 16 of the U-bolt 12 could withstand before failing. Such a range of optimum torque values (i.e., Tmin to Tmax) has been found desirable in securing U-bolt assemblies 10 because, for example, it is sometimes difficult to get an accurate torque reading from a torque wrench or gun. By using such load safety factors LF, the end user is less likely to over-torque the nuts 24, and thereby cause damage to the U-bolt 12. Examples of optimum torque values, Tmin and Tmax, calculated according to the preceding formulas are compiled in Table II.

of friction K, and therefore, the optimum torque T for the assembly 10. These friction factors generally include anything that causes friction between the various elements of the U-bolt assembly 10 during torquing. The presence of friction typically means having to apply a greater torque to produce the same applied load to the U-bolt 12. Specifically, the various torquing friction factors may include the nominal diameter of the threaded end 18, the finish of any bearing surface, such as the threaded ends 18 and nuts 24, as well as the bearing surfaces between the nuts 24, the washers 26, and bracket 20. These friction factors may also include the stiffness of the resulting joint formed, the speed at which nuts 24 are torqued, and the thread tolerance between the threaded ends 18 and the nuts 24. The U-bolt assembly designation data portion of indicia 40 may include one or a combination of any of these or other torquing friction factors but preferably includes only the most influential of these factors.

TABLE II

| D (in.) | R (in.) | R/D | X | C | B | CA (in$^2$) | TN (psi) | UL (lbs) | d (in.) | K K | T$_{min}$ (Ft-lbs) | T$_{max}$ (Ft-lbs) |
|---|---|---|---|---|---|---|---|---|---|---|---|---|
| 0.345 | 0.125 | 0.362 | 0.070 | 0.650 | 67.5% | 0.093 | 120,000 | 7,533 | 0.375 | 0.15 | 21 | 27 |
| 0.345 | 0.250 | 0.725 | 0.070 | 0.650 | 70.1% | 0.093 | 120,000 | 7,823 | 0.375 | 0.15 | 22 | 28 |
| 0.345 | 0.375 | 1.087 | 0.070 | 0.650 | 72.6% | 0.093 | 120,000 | 8,102 | 0.375 | 0.15 | 23 | 29 |
| 0.345 | 0.500 | 1.449 | 0.070 | 0.650 | 75.1% | 0.093 | 120,000 | 8,381 | 0.375 | 0.15 | 24 | 30 |
| 0.345 | 0.625 | 1.812 | 0.070 | 0.650 | 77.7% | 0.093 | 120,000 | 8,671 | 0.375 | 0.15 | 24 | 31 |
| 0.345 | 0.750 | 2.174 | 0.070 | 0.650 | 80.2% | 0.093 | 120,000 | 8,950 | 0.375 | 0.15 | 25 | 32 |
| 0.345 | 0.875 | 2.536 | 0.070 | 0.650 | 82.8% | 0.093 | 120,000 | 9,241 | 0.375 | 0.15 | 26 | 33 |
| 0.345 | 1.000 | 2.899 | 0.070 | 0.650 | 85.3% | 0.093 | 120,000 | 9,520 | 0.375 | 0.15 | 27 | 34 |
| 0.345 | 1.250 | 3.623 | 0.070 | 0.650 | 90.4% | 0.093 | 120,000 | 10,089 | 0.375 | 0.15 | 28 | 36 |
| 0.345 | 1.506 | 4.348 | 0.070 | 0.650 | 95.4% | 0.093 | 120,000 | 10,647 | 0.375 | 0.15 | 30 | 37 |
| 0.345 | 2.000 | 5.797 | 0.070 | 0.650 | 100.0% | 0.093 | 120,000 | 11,160 | 0.375 | 0.15 | 31 | 39 |
| 0.345 | 2.500 | 7.246 | 0.070 | 0.650 | 100.0% | 0.093 | 120,000 | 11,160 | 0.375 | 0.15 | 31 | 39 |

Figure 2:
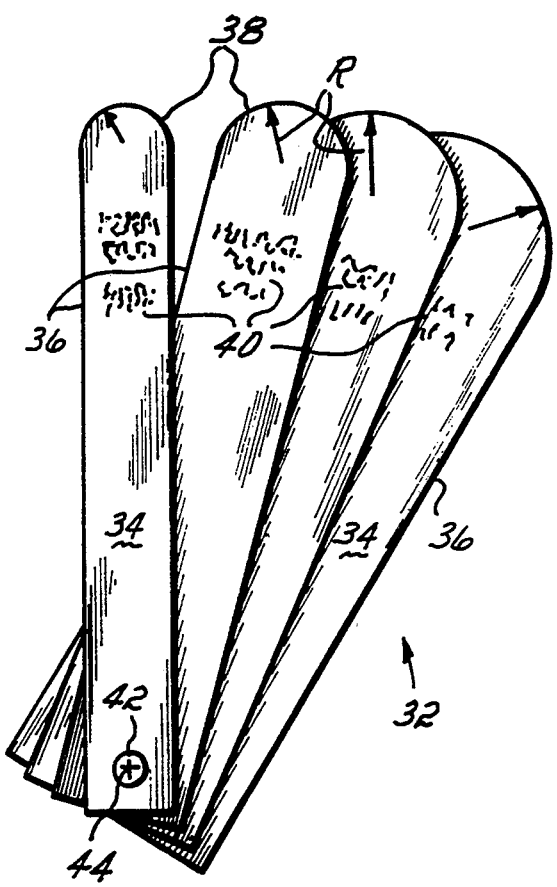
FIG. 2 is a top view of one embodiment of the present tool.

One key element in determining the optimum torque T is the bend radius R of each U-bolt bend 14. Referring to FIG. 2, one embodiment of a tool 32 has been devised to facilitate the measurement of each bend radius R, and in turn, to obtain the corresponding optimum torque T to be used in securing the subject U-bolt assembly 10. Broadly speaking, the present tool embodiment 32 is a card or strip of material having a surface 34 and an edge 36. The edge 36 includes a corner 38 having a radius for testing the bend radius R. Preferably, the radius of the corner 38 is approximately equal to the bend radius R being tested. Indicia 40 is located on the surface 34 which includes designation data for at least one U-bolt assembly 10 and its corresponding optimum torque T, as calculated using the preceding formulas. Preferably, the indicia 40 includes designation data for a plurality of U-bolt assemblies 10 and the corresponding optimum torque values T. The designation data portion of indicia 40 may include torque friction factors associated with each U-bolt assembly 10 and the size (nominal diameter and thread pitch) and grade (industry standard minimum mechanical properties) of at least one U-bolt 12, as well as the bend radius R of each U-bolt leg 16. In calculating the optimum torque values T for use as part of indicia 40, the ultimate tensile strength TN used is that specified for the U-bolt grade designated rather than the actual ultimate tensile strength (such as that used in the previously discussed regression analysis to obtain constant C and coefficient X). Each U-bolt leg 16 of the designated U-bolt assemblies 10 has a bend radius R equal to the radius of the corner 38. While the tool 32, as shown, only has one corner 38, tools 32 having a plurality of corners 38 are envisioned with each corner 38 having a radius equal to a different bend radius R.

Each U-bolt assembly 10 has a number of associated friction factors which may affect the torque coefficient As shown in FIG. 2, a plurality of tools 32 may be joined together at a point 42 distal from their respective corners 38 such that each tool 32 may be pivoted about an axis 44 passing through points 42. Thus, any one of the tools 32 may be pivoted about axis 44 in a manner similar to opening a hand fan. The appropriate tool 32 may then be chosen for the particular U-bolt assembly 10 being installed as determined by the designation data of indicia 40. The corner 38 of the chosen tool 32 may be used to verify or determine the radius of the bends 14 of the particular U-bolt assembly 10 being installed. The corresponding optimum torque T may then be read from indicia 40 and applied to nuts 24.

Figure 3:
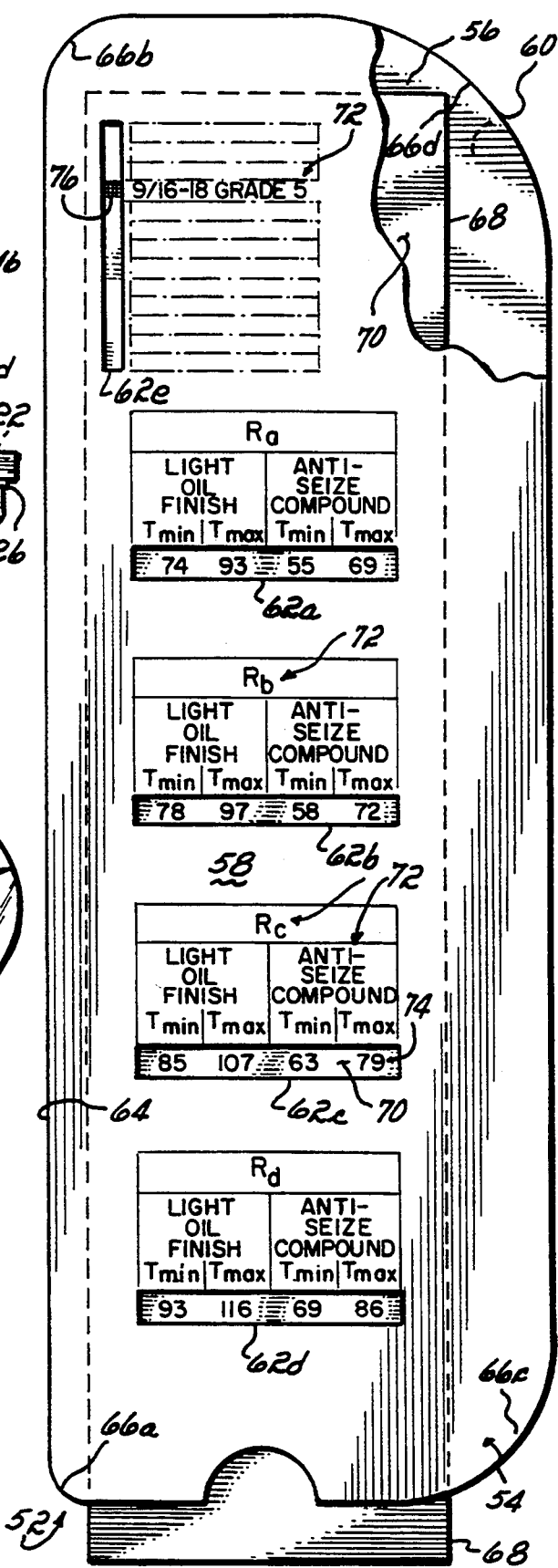
FIG. 3 is a top planar view of the front of another embodiment of the present tool.

Referring to FIG. 3, an alternative tool 52 incorporating the principles of the present invention includes a slide holder 54 having a pocket cavity 56 formed between two sheets having a first and second outer surface 58 and 60, respectively. At least one window or aperture 62, and preferably a plurality of windows 62, is formed in at least the first outer surface 58. The slide holder 54 has an outer edge 64 with at least one corner 66. A slide 68 having a third surface 70 is dimensioned to be slidable in and out of the pocket cavity 56 to varying depths. First indicia 72 and second indicia 74 are respectively located on the first surface 58 and third surface 70. The first indicia 72 includes designation data for a plurality of U-bolt assemblies 10. The second indicia 74 includes a plurality of optimum torque values corresponding to the U-bolt assembly designation data of the first indicia 72. Varying portions of the indicia 74 on the third surface 70 are visible through the aperture 62 as the depth of the slide 68 in the pocket cavity 56 is varied.

In one preferred embodiment, the slide holder 54 has a plurality of corners 66a-d, with the radius of each corner 66a-d corresponding to the bend radius R of a different U-bolt bend 14 (e.g., 0.250", 0.500", 1.000" and 1.500", respectively). In addition, a plurality of apertures 62 are formed through the first outer surface 58. Each corner 66a-d has a corresponding aperture 62a-d. Preferably, the first indicia 72 includes U-bolt bend radius indicia Ra-d located adjacent to corresponding corners 66a-d and apertures 62a-d. The first indicia 72 also includes at least one, and preferably a plurality of, torquing friction factors located adjacent to each aperture 62a-d. By way of example, the friction factors of indicia 72 may include a light oil finish designation and an anti-seize compound designation. The first indicia 72 also includes at least one, and preferably a plurality of, U-bolt size and grade designations located adjacent to its own aperture 62e.

Thus, the U-bolt assembly designation data of indicia 72 may include the size and grade of each U-bolt 12, the radius R of each U-bolt bend 14, and at least one torquing friction factor. Some friction factors will likely have more of an effect on the applied torque than other such factors. Therefore, torquing friction factors which are particularly influential may be included while other less influential factors ignored. The finish of the U-bolt assembly bearing surfaces has typically been found to be a particularly influential friction factor.

The second indicia 74 may include an optimum torque value T for each U-bolt assembly 10 designated. Preferably, minimum (Tmin) and maximum (Tmax) torque values are provided for each U-bolt assembly 10 designated. The minimum and maximum torque Tmin and Tmax are obtained by varying the load safety factor LF, such as from 60% to 75%, respectively. The second indicia 74 may also include a U-bolt assembly selection mark 76. When the slide 68 is inserted into the pocket cavity 56 to an appropriate depth, the selection mark 76 is visible through aperture 62e and corresponding optimum torque values Tmin and Tmax are visible through associated apertures 62a-d.

To obtain the optimum torque values Tmin and Tmax for a given U-bolt assembly 10, the slide 68 is inserted into the pocket cavity 56 to a depth such that the selection mark 76 is positioned adjacent to the U-bolt size and grade of the chosen U-bolt assembly 10. As with the previous tool 32, the corners 66 of tool 52 may be used to verify or determine the bend radius of the U-bolt 12 used in the chosen U-bolt assembly 10. Knowing the bend radius of the U-bolt 12 used in the chosen U-bolt assembly 10, the optimum torque values Tmin and Tmax corresponding to the chosen U-bolt assembly 10 are visible through the appropriate aperture 62a-d.

The preceding tool embodiments may be susceptible to many modifications including locating the first and second indicia 72 and 74 on the third and first surfaces 70 and 58, respectively.

It will be understood by those skilled in the art that various changes may be made and equivalents may be substituted for elements of the present invention without departing from the scope of the invention. Therefore, it is intended that the present invention only be limited by the scope of the appended claims.

What is claimed is:

1. A tool used in securing different types of U-bolt assemblies, each U-bolt assembly including a U-bolt having two end-threaded legs and a bend radius for each leg, the tool comprising:

a slide holder having a pocket cavity formed between a first and second outer surface, at least said first outer surface having at least one window, and a radius for testing the U-bolt bend radius;

a slide having a third surface slidable within said pocket cavity to varying depths; and first indicia including designation data for the different types of U-bolt assemblies and second indicia including a plurality of corresponding optimum torque values for securing the different types of U-bolt assemblies, one of said first and second indicia being located on said first outer surface or said third surface, varying portions of the indicia on said third surface being visible through said window as the depth of said slide in said pocket cavity is varied, whereby a particular type of U-bolt assembly to be secured is selected by inserting said slide into said pocket cavity a particular depth, the optimum torque value for said particular type of U-bolt assembly being determinable by reading the portions of the indicia on said third surface visible through said window and corresponding indicia located on said first outer surface adjacent to said window.

2. The tool of claim 1, said slide holder having a plurality of corners, each of said corners having a different radius for testing one U-bolt bend radius.

3. The tool of claim 1, said first indicia including at least one torquing friction factor.

4. The tool of claim 3, said first indicia including at least one torquing friction factor from the group consisting of U-bolt leg diameter, finish of U-bolt leg threaded ends, thread finish of fastening nuts threaded on U-bolt legs, finish of bearing surfaces, joint stiffness, speed of assembling the U-bolt assembly, thread tolerance between threaded ends of the U-bolt legs and fastening nuts, and combinations thereof.

5. The tool of claim 1, said first indicia being located on said first outer surface and said second indicia being located on said third surface.

6. The tool of claim 5, a portion of said first indicia being located on said second outer surface.

7. The tool of claim 1, said first outer surface having a plurality of U-bolt size and grade designations located adjacent to a first window, and one U-bolt bend radius designation and at least one torque friction factor designation located adjacent to each of a plurality of second windows, and said third surface having a selection mark located thereon, whereby the optimum torque value for a particular U-bolt assembly is visible through the second window located adjacent to the bend radius and torque friction factor designations of the particular U-bolt assembly when said slide is inserted into said pocket cavity until said selection mark is visible through said first window and positioned adjacent to the size and grade designation of the particular U-bolt assembly.

* * * * *